(12) United States Patent
Park

(10) Patent No.: US 6,318,209 B1
(45) Date of Patent: Nov. 20, 2001

(54) SHIFT LEVER POSITION ADJUSTMENT DEVICE FOR AN AUTOMOTIVE VEHICLE

(75) Inventor: Young-Hee Park, Pusan (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/467,727

(22) Filed: Dec. 20, 1999

(30) Foreign Application Priority Data

Mar. 25, 1999 (KR) .................................................... 99-4793

(51) Int. Cl.[7] .............................. F16H 59/02; G05G 1/04
(52) U.S. Cl. ......................... 74/525; 74/473.3; 180/334
(58) Field of Search .................................. 74/473.3, 522, 74/524, 525, 535, 538; 180/315, 326, 334, 336

(56) References Cited

U.S. PATENT DOCUMENTS

| | | | |
|---|---|---|---|
| 1,168,382 | * | 1/1916 | Faas et al. ................................ 74/525 |
| 1,176,077 | * | 3/1916 | Melton ..................................... 74/525 |
| 4,741,222 | * | 5/1988 | Berndt ................................ 74/525 X |

* cited by examiner

Primary Examiner—Allan D. Herrmann
(74) Attorney, Agent, or Firm—Christie, Parker & Hale, LLP

(57) ABSTRACT

A neutral shift lever position control device for an automotive vehicle includes a swing block pivotally connected to a vehicle body by a rod, a shift lever at one end thereof pivotally connected to the pivot shaft, a neutral position selector which is cylindrical such that the shift lever is inserted therethrough, and a knob screwed onto a free end of the shift lever.

8 Claims, 5 Drawing Sheets

SHIFT LEVER POSITION ADJUSTMENT DEVICE FOR AN AUTOMOTIVE VEHICLE

BACKGROUND OF THE INVENTION (a) Field of the Invention

The present invention relates to a shift lever of an automotive vehicle, and in particular, to a shift lever position adjustment device of an automotive vehicle.

(b) Description of the Related Art

A shift lever assembly provides for operating a transmission of an automotive vehicle and includes a shift lever which extends upwardly into the driver's compartment. FIG. 5 shows a prior art shift lever assembly. As shown in FIG. 5, a shift lever assembly includes a shift lever case 4, a shift lever 2 connected at one end thereof to the case 4, and a bracket 6 interposed between the case 4 and the shift lever 2 so as to pivotally connect the shift lever 2 to the case 4 by means of a pin 12. At the other end of the shift lever, a knob is formed so as to be gripped by a driver.

In this prior art shift lever assembly, since the shift lever 2 is fixedly mounted thereon, it is impossible to adjust the shift lever to be at a proper position according to a driver's body type.

SUMMARY OF THE INVENTION

The present invention has been made in an effort to solve the above problem of the prior art.

It is an object of the present invention to provide a shift lever position adjustment device capable of adjusting a position of the shift lever to fit the driver.

To achieve the above object, a shift lever position adjustment device for an automotive vehicle comprises a swing block pivotally connected to a vehicle body by a support rod, a shift lever at one end thereof pivotally connected to a pivot shaft, a neutral position selector which is cylindrical such that the shift lever is inserted therethrough, and a knob screwed onto a free end of the shift lever.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

A preferred embodiment of the present invention will be described hereinafter with reference to the accompanying drawings.

Figure 1:
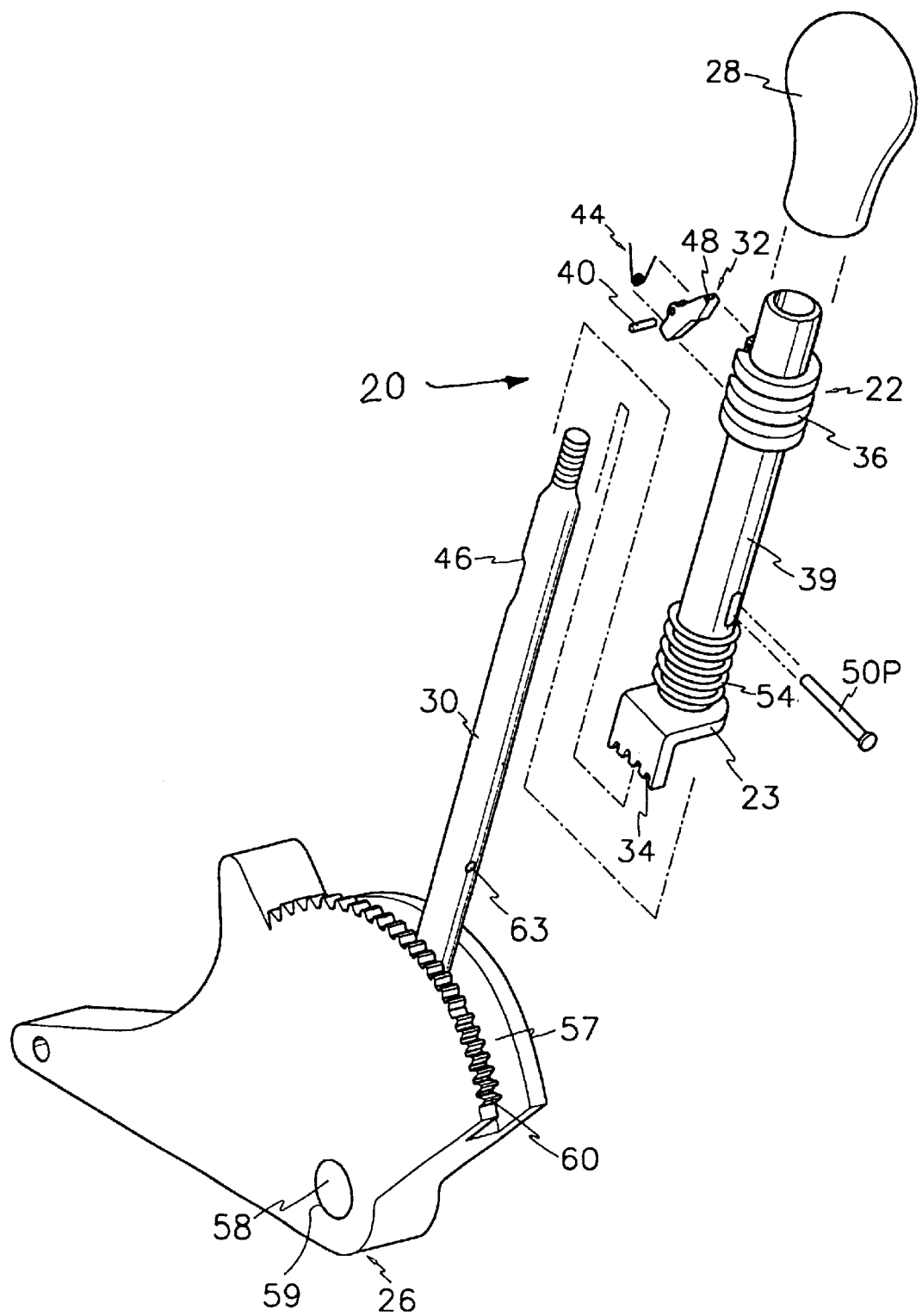
FIG. 1 is an exploded view of a shift lever position adjustment device according to the preferred embodiment of the present invention.

FIG. 1 shows an exploded view of a shift lever position adjustment device according to a preferred embodiment of the present invention.

As shown in FIG. 1, the shift lever position adjustment device 20 comprises a swing block 26 secured in a shift lever case (not shown), a shift lever 30 connected at one end thereof to the swing block 26, a position selector 22 which is cylindrical such that the shift lever 30 is inserted therein, and a knob 28 which is fixedly screwed at the other end of the shift lever 30 after the shift lever 30 is inserted into the position selector 22.

Figure 2:
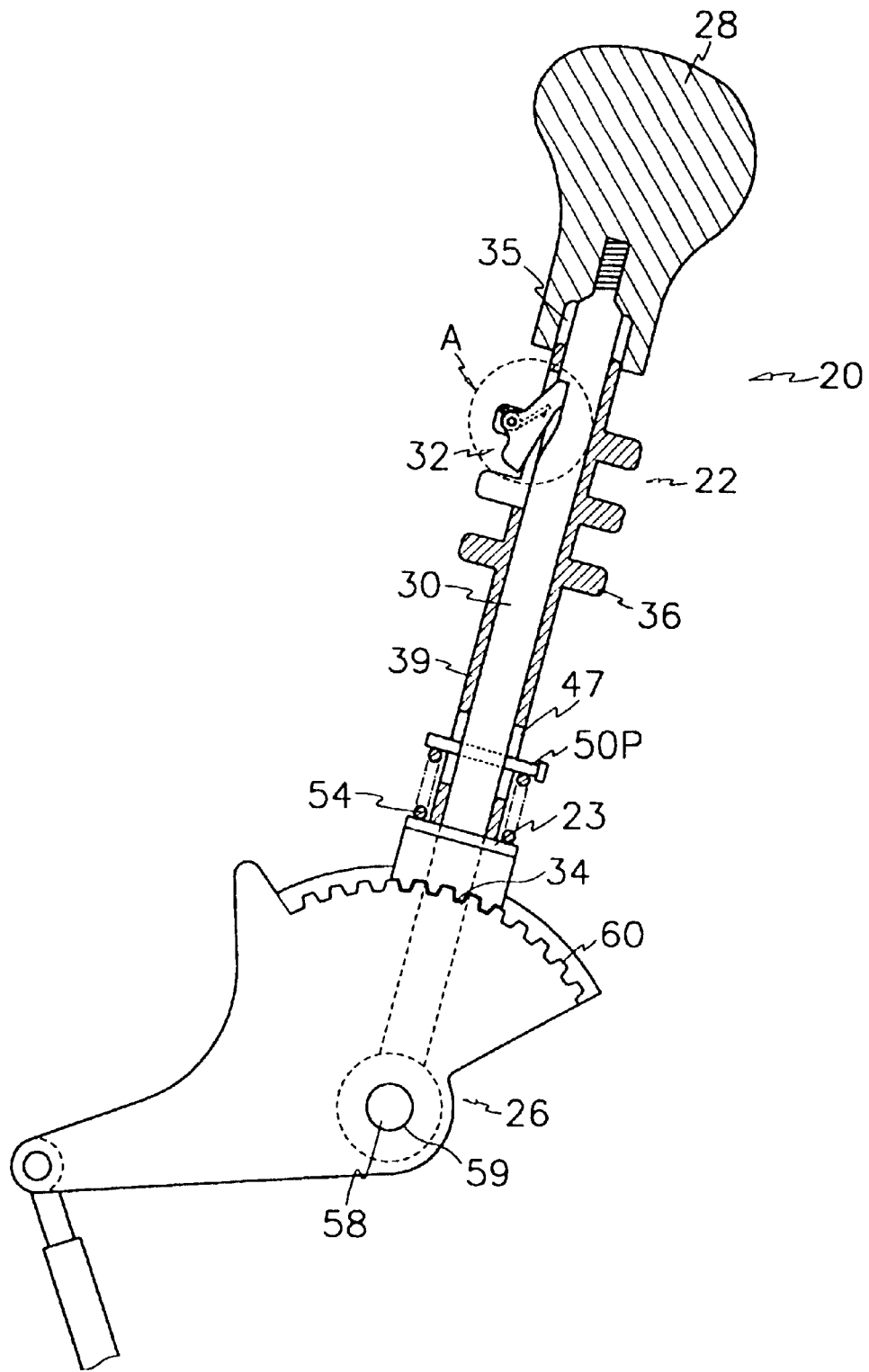
FIG. 2 is a side cross-sectional view of the lever position adjustment device of FIG. 1.

The swing block 26 is a thick plate having an arc shape on its upper portion and a groove is formed on the arc shaped upper surface of the swing block 26 such that one end of the shift lever 30 is pivotally connected to a pivot shaft 59 through an opening (not shown) formed inside the groove 57 (see FIG. 2). On one of the arc shaped banks that define the groove 57, gear teeth 60 are formed.

The position selector 22 comprises a cylindrical tube 39; a shift lever fixer 23 fixedly mounted on an upper end of the tube 39 which has teeth 34 so as to selectively engage with the teeth 60 of the swing block 26; a coil spring 54 mounted around a lower portion of the tube 39 and limited by a pin 50P, which is inserted into a hole 63 of shift lever 30 and pin passages 47 formed at a predetermined distance from the lower end of the tube 39 in a shape of a needle eye, such that an upward movement of the tube 39 is limited; rings 36 surrounding an upper portion of the tube 39; and a stopper 32 surrounded by the rings 36, pivotally mounted at one side of the tube portion by means of torsion spring 44 and spring pin 40 such that a head 48 of the stopper 32 is selectively inserted into a hole 46 formed at a corresponding position on the shift lever 30 to stop the tube 39 from moving up while the head 48 of the stopper 32 is inserted into the hole 46.

Figure 3:
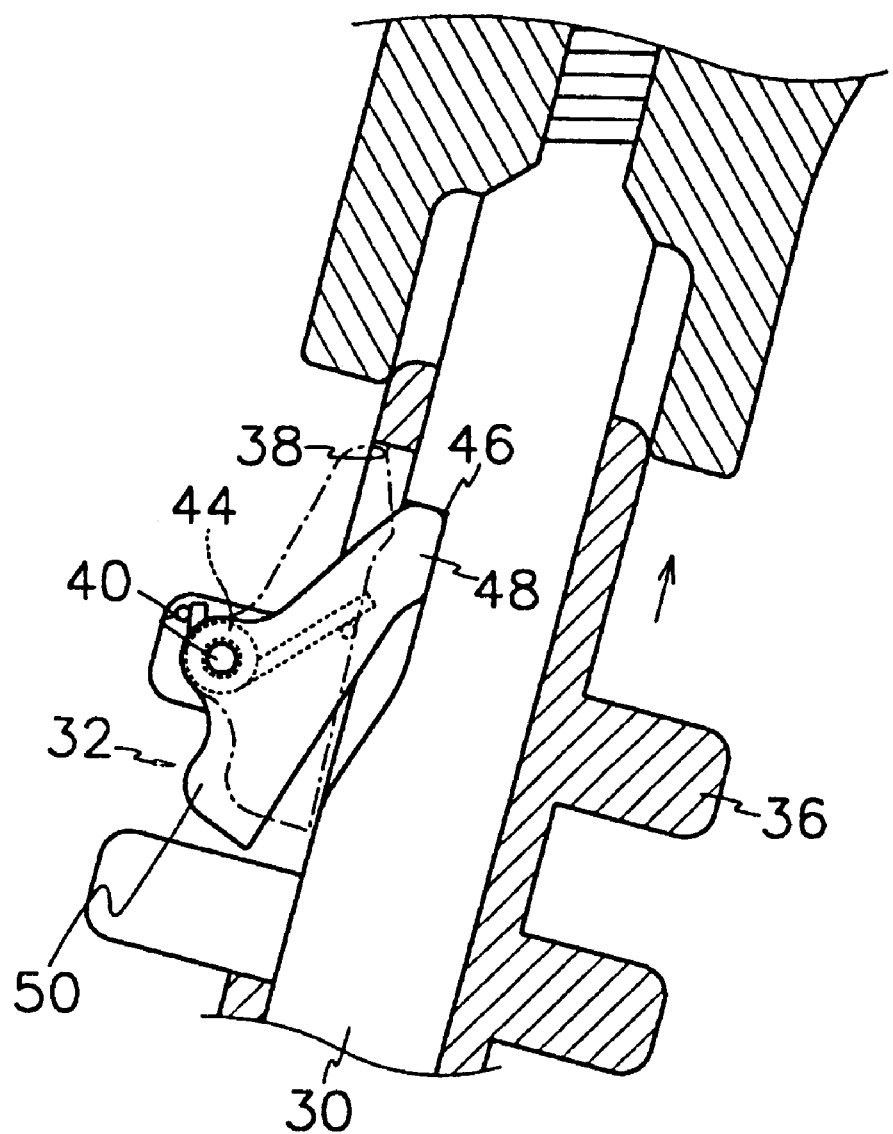
FIG. 3 is an enlarged view of portion A of FIG. 2.
Figure 4:
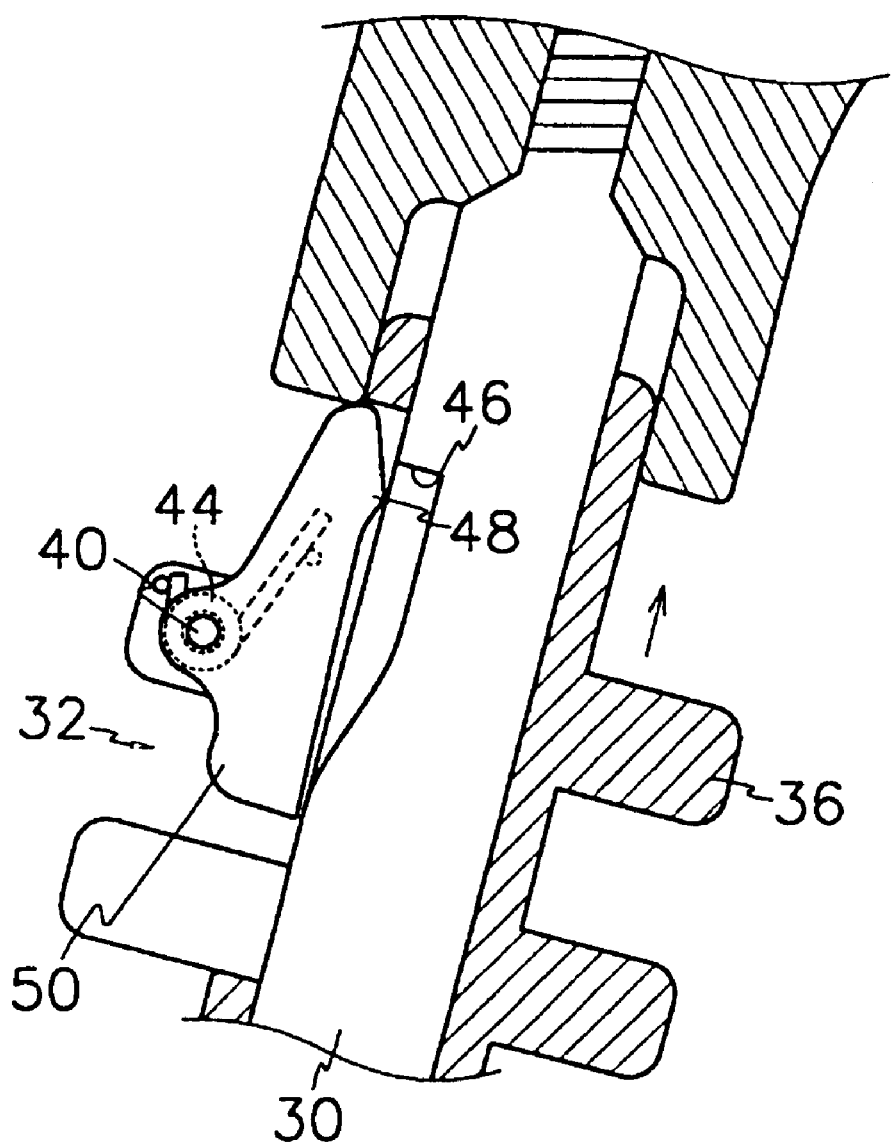
FIG. 4 is a view showing an operational behavior of the lever position adjustment device of FIG. 3.
Figure 5:
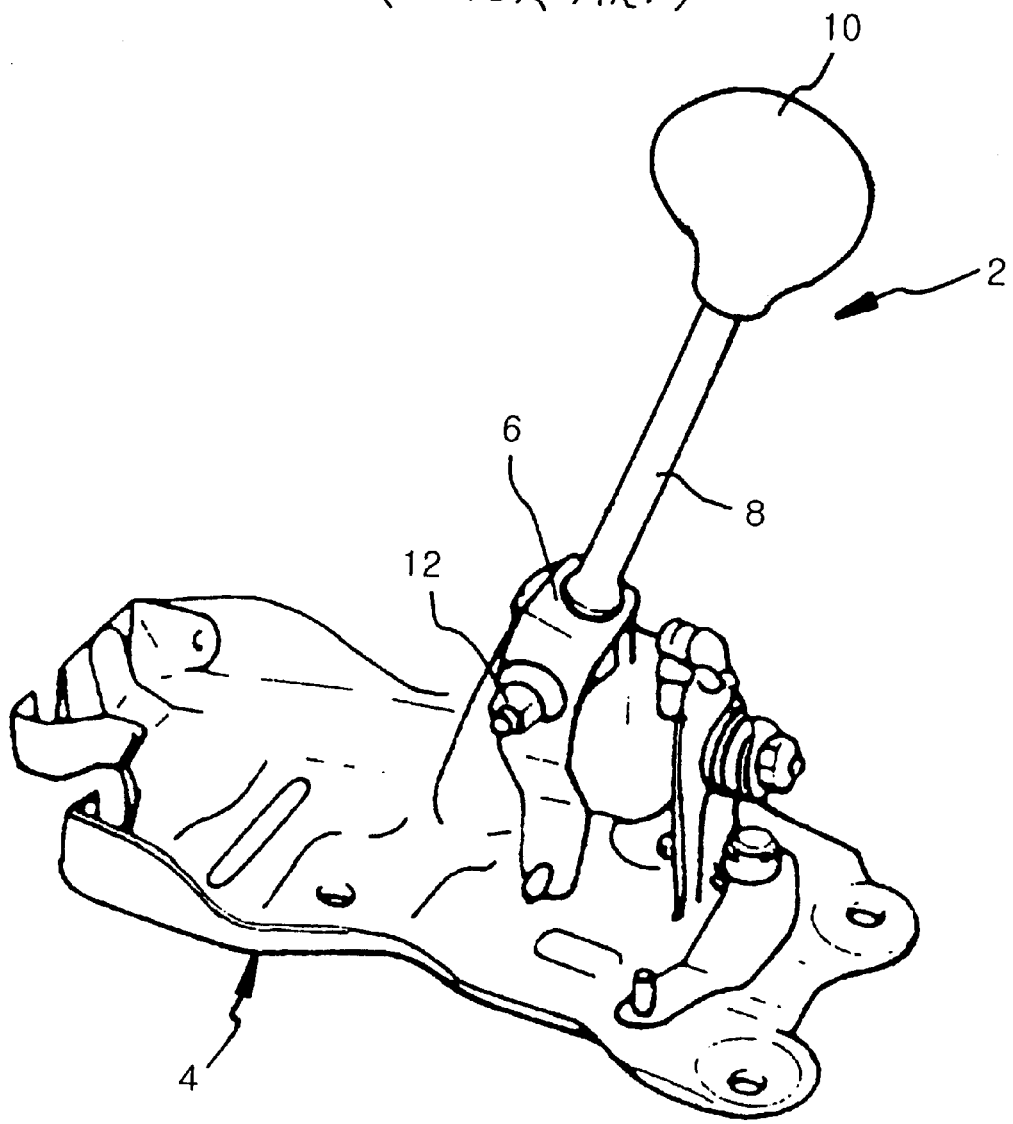
FIG. 5 is a schematic view showing a prior art shift lever assembly.

As shown in FIG. 3 and FIG. 4, the stopper 32 includes the depressing portion 50 and the head 48 such that the head 48 is initially inserted into the hole 47, and if the depressing portion 50 is depressed, the head 48 is released therefrom.

The knob 28 is formed in such a way that the upper end of the shift lever 30 is screwed into a threaded hole formed on a lower portion of the knob 28 and an entrance portion of the hole 35 has a larger diameter than the threaded portion such that the tube 39 can be partially inserted therein.

The operation of the shift lever position adjustment device according to the preferred embodiment of the present invention will be described hereinafter.

Initially, the head 48 of the stopper 32 is inserted into the hole 46 of the is shift lever 30. If the shift lever position does not fit the driver's body, the depressing portion 50 is depressed by the driver such that the head 48 of the stopper 32 is released from the hole 46. In this case, the position selector 22 can be moved upward so as to disengage the shift lever fixer 23 from the gear teeth 60 such that the select lever 30 can be moved to and fro within a predetermined range. Accordingly, the shift lever 30 can be located at a desired position. When the shift lever 30 is located at the desired position, if the driver releases the position selector 22 the shift lever fixer teeth 34 are engaged with the gear teeth by an elastic force of the coil spring 54 such that the shift lever position is reset to fit the driver's body. At the same time, the head 48 of the stopper 32 is biased by the torsion spring 44 so as to be inserted into the hole 46. The stopper 32 also prevents the position selector 22 moving upward by any impact caused by uneven road surfaces.

As described above, in the shift lever position adjustment device, since the shift lever position can be adjusted by the driver's intention, an optimal driving comfort can be obtained regardless of changing of the driver. Also the shift lever position can be adjusted to fit the driver such that driving fatigue decreases, resulting in a reduction of traffic accidents.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A shift lever position adjustment device for an automotive vehicle comprising:
   a swing block pivotally connected to a vehicle body;
   a shift lever pivotally connected to a swing block; and
   a position selector comprising,
      a cylindrical tube in which the shift lever is inserted,
      a shift lever fixer mounted on an upper end of the cylindrical tube,
      a coil spring provided around a lower portion of the tube so as to bias the position selector upward,
      rings surrounding an upper portion of the tube, and
      a stopper pivotally mounted by means of a torsion spring and a spring pin at one side of the tube surrounded by the rings such that a head portion of the stopper is selectively inserted into a hole formed in the shift lever, wherein the position selector fixes the shift lever on the swing block at a predetermined position after the shift lever is displaced to the predetermined position.

2. A shift lever position adjustment device of claim 1 wherein the swing block has an arc shaped upper portion having gear teeth.

3. A shift lever position adjustment device of claim 1 wherein the shift lever fixer has teeth for engaging with the gear teeth of the swing block.

4. A shift lever position adjustment device of claim 3 wherein the stopper comprises a stopper head which is inserted into the hole formed on the shift lever by a biasing force of the torsion spring, and a depressing portion for releasing the stopper head from the hole of the shift lever by depressing it.

5. A shift lever position adjustment device of claim 1 wherein the swing block is formed in such a way that one end of the shift lever is pivotally connected to a pivot shaft which passes through an opening formed at a lower portion of the swing block.

6. A shift lever position adjustment device for an automotive vehicle comprising:
   a swing block pivotally coupled to a vehicle body;
   a shift lever pivotally coupled to a swing block; and
   a position selector comprising,
      a tube in which the shift lever is inserted,
      a spring coupled to the tube so as to bias the position selector upward, and
      a stopper pivotally mounted on the tube such that a portion of the stopper is selectively inserted into a depression formed in the shift lever, wherein the position selector fixes the shift lever on the swing block at a predetermined position after the shift lever is displaced to the predetermined position.

7. A shift lever position adjustment device of claim 6 further comprising a second spring coupled to the stopper and to the tube.

8. A shift lever position adjustment device of claim 7 wherein the second spring biases the portion of the stopper into the depression.

* * * * *